US008646053B2

United States Patent
Laertz et al.

(10) Patent No.: US 8,646,053 B2
(45) Date of Patent: *Feb. 4, 2014

(54) CONTROLLING ACCESS OF A CLIENT SYSTEM TO AN ACCESS PROTECTED REMOTE RESOURCE

(75) Inventors: Stephan Laertz, Herrenberg (DE); Peter Fischer, Kronach (DE); Carsten Leue, Sindelfingen (DE); Thomas Schaeck, Achern (DE)

(73) Assignee: International Business Machines Corporation, Armonk, NY (US)

( * ) Notice: Subject to any disclaimer, the term of this patent is extended or adjusted under 35 U.S.C. 154(b) by 184 days.

This patent is subject to a terminal disclaimer.

(21) Appl. No.: 12/967,956

(22) Filed: Dec. 14, 2010

(65) Prior Publication Data

US 2011/0145898 A1 Jun. 16, 2011

Related U.S. Application Data

(62) Division of application No. 11/027,121, filed on Dec. 30, 2004, now Pat. No. 7,882,546.

(30) Foreign Application Priority Data

Mar. 4, 2004 (DE) .................................... 04100885

(51) Int. Cl.
 *G06F 7/04* (2006.01)

(52) U.S. Cl.
 USPC ....... 726/5; 726/2; 726/12; 713/151; 713/168

(58) Field of Classification Search
 None
 See application file for complete search history.

(56) References Cited

U.S. PATENT DOCUMENTS

| 7,954,144 B1* | 5/2011 | Ebrahimi et al. ............... 726/12 |
| 2002/0116511 A1* | 8/2002 | Boehme et al. ............... 709/230 |
| 2003/0115267 A1* | 6/2003 | Hinton et al. ................. 709/204 |

* cited by examiner

*Primary Examiner* — Shewaye Gelagay
(74) *Attorney, Agent, or Firm* — Steven Greenberg, Esq.; Carey, Rodriguez, Greenberg & O'Keefe

(57) ABSTRACT

The present invention provides a security module for Web application, especially a portal application, using a rewriter proxy. The security module ensures that the rewritten URIs are appended by an authentication identifier for determining whether the rewritten URI has not been changed. Preferably, the authentication identifier can be generated by applying a secure hash algorithm and/or secret key to the original URIs of the remote resource or the entire rewritten URIs. When a client activates those URIs, a request is sent to the rewriter proxy. Before a connection to the access protected remote resource is established, the security module validates whether the URIs contained in the user client request have been changed by the user.

14 Claims, 5 Drawing Sheets

CONTROLLING ACCESS OF A CLIENT SYSTEM TO AN ACCESS PROTECTED REMOTE RESOURCE

CROSS-REFERENCE TO RELATED APPLICATIONS

This application is a Divisional of U.S. patent application Ser. No. 11/027,121, filed Dec. 30, 2004, now issued as U.S. Pat. No. 7,882,546, entitled "CONTROLLING ACCESS OF A CLIENT SYSTEM TO AN ACCESS PROTECTED REMOTE RESOURCE," which is a non-provisional patent application claiming benefit to German Patent Application 04100885.5, filed Mar. 4, 2004," the entirety of which are incorporated herein by reference.

BACKGROUND OF THE INVENTION

1. Statement of the Technical Field

The present invention relates in general to method and system for controlling access of a client system to an access protected remote resource via a Web Application, especially a Portal application, using a rewriter proxy.

2. Description of the Related Art

A rewriter proxy is defined as a component which routes incoming user client requests to access protected remote resources as well as processes and modifies the returned content so that links point to the rewriter proxy instead of the access protected remote resource. An access protected remote resource means any resource that provides content that is protected against unauthorized access, e.g. by using a firewall. In this regard, FIG. 1 shows the prior art communication flow between client system, portal application using rewriter proxy, and access protected remote resources.

In a typical web application communication scenario, especially a portal application scenario, a user of a client system authenticates itself against the portal application and receives a portal page with a portlet that contains links to access protected remote resources behind a firewall which are not accessible for the client directly. Therefore a resource proxy has to ensure that all incoming client requests as well as incoming responses from the access protected remote resources are respectively rerouted to their destination.

To achieve this it is a common technique of the rewriter proxy application to detect such links to access protected remote resources in the incoming content provided by the remote application and to rewrite these links in a way that the rewritten uniform resource identifiers (URIs point to the rewriter proxies and contain the original remote location as some kind of parameter. The rewritten URIs are then part of the generated content and replace the original URIs. The user of the client system which displays the content which includes these rewritten links, sends a request to the rewriter proxy asking to handle the link traversal. In order to serve the request the rewriter proxy gets the original location of the access protected remote resource from the rewritten URI and retrieves the resource content to which the links refers.

More specifically, with respect to FIG. 1, there is shown a prior art communication process between client system 1, portal application 2 using rewriter proxy 14, and access protected remote resources 3. For example access protected remote resources 3 are databases, transaction systems, syndicated content provider, remote web sites which are connected with the portal application by network (e.g. Internet).

Access protected remote resources 3 mean that a user client cannot directly access remote resources but all user requests are rerouted via the rewriter proxy 14 to the access protected remote resources 3 (e.g. access protected remote resources are secured by a Firewall). The communication process begins with a client request to a portal application 2. After successful authentication, the portal application 2 provides a first portal page 7 to the client system 1. All links included in that portal page 7 that provide access to access protected remote resources 3 are rewritten by the rewriter proxy 14 insofar that the original URI 9 pointing to the access protected remote resource 3 is replaced by the URI of the rewriter proxy 14.

Preferably, the original URI 9 is added as a parameter in that rewritten URI 10. When the user of the client system 1 activates a link included in the portal page 7, a request including the rewritten URI 10 is sent to rewriter proxy 14 that reads the rewritten URI 10 and extracts the URI 9 of the access protected remote resource 3. Then the rewriter proxy 14 connects to the access protected remote resource 3 and subsequently rewrites all the URIs 9 received from the access protected remote resource 3.

The described and commonly used technique of rewriting resource URIs as handled by a rewriter proxy opens a potential security hole which allows users to access remote applications which are protected by security setups that prohibit the access to the users but grant access to the remote application for the proxy application only. The security holes arises from the fact that most rewriter proxy generate resource URIs in a manner that does not guarantee that a user is not able to create URIs that reference known protected resources and which appear valid and thus are served by the proxy application. Often the location of the access protected remote resource is simply encoded in the generated resource URI in plaintext.

An attacker knowing the location of an access protected remote resource of interest can inspect the content for a valid rewritten resource URI and can change the value of the resource location parameter to the location of the protected resource he wants to retrieve. The modified resource URI can than be used to send a request to the rewriter proxy to retrieve the access protected remote resource. Thus the attacker can use the rewriter proxy to tunnel through the firewall.

To combat potential security threats, one solution includes the rewriter proxy managing some kind of access table that holds URIs to all access protected remote resources. When a user sends a request to an access protected resource the rewriter proxy checks against this table if the user is allowed to access that resource. Yet, this technique requires an access control check on each request and also increases the configuration effort with increasing number of access protected remote resources.

Another known solution is to store each resource URIs that appears in the remote content in a session object. When the rewriter proxy rewrites the resource URIs, a reference to the URI session object is inserted into the rewritten URI instead of the resource location. This ensures that users can only access resources which have passed the rewriter proxy. On the other hand it has several disadvantages namely users can not bookmark the rewritten resource URIs, caching of resources by caching proxies is not possible, and high memory consumption is given.

Therefore, it is object of the present invention to provide a method and system method and system for controlling access of a client system to an access protected remote resource via a Web Application, especially a portal application, using a rewriter proxy avoiding disadvantages of the prior art.

SUMMARY OF THE INVENTION

The present invention provides a security module for Web application, especially portal application, using a rewriter proxy. The security module ensures that the rewritten URIs are appended by an authentication identifier for determining that the rewritten URI has not been changed. Preferably, the authentication identifier can be generated by applying a secure hash algorithm and/or secret key to the original URIs of the remote resource or the entire rewritten URIs.

When a client activates those URIs, a request is sent to the rewriter proxy. Before a connection to the access protected remote resource is established, the security module validates whether the URIs contained in the user client request have been changed. This is accomplished by applying the same secure hash algorithm and/or the same secret key to the original URI or rewritten URI contained in the client request. If the calculated authentication identifier matches with the authentication identifier contained in the client request, the rewriter proxy connects to the access protected remote resource.

This invention enables a rewriter proxy to generate URIs to access protected remote resources in a way that does not allow users to create links to access protected remote resources other than links which have been passed the rewriter proxy rewriting mechanism.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The above, as well as additional objectives, features and advantages of the present invention will be apparent in the following detailed written description while the novel feature of the present invention is set forth in the appended claims. The invention itself, however, as well as a preferred mode of use, further objectives, and advantages thereof, will be best understood by reference to the following detailed description of an illustration embodiment when read in conjunction with the accompanying drawings, wherein:

DETAILED DESCRIPTION OF THE PREFERRED EMBODIMENT

Figure 1:
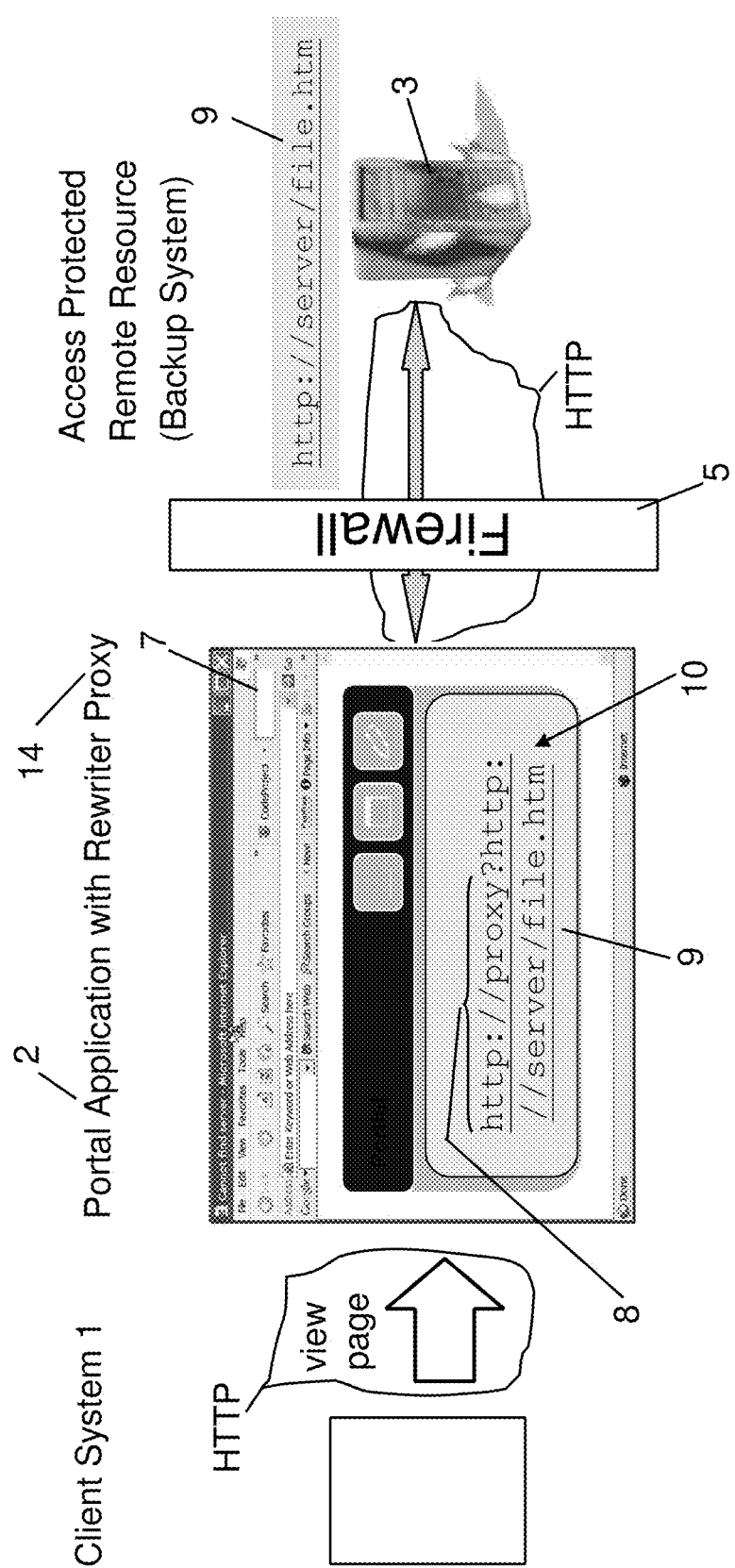
FIG. 1 shows the prior art communication flow between client system, portal application using rewriter proxy, and access protected remote resources.
Figure 2:
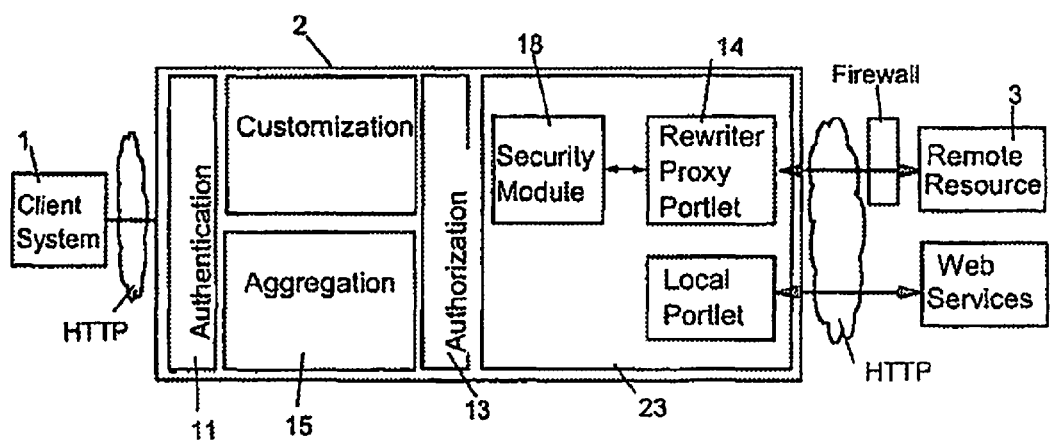
FIG. 2 shows a preferred implementation of the inventive security module in a Portal application using a rewriter proxy.

FIG. 2 shows preferred implementation of the inventive security module 18 in a Portal application 2 using a rewriter proxy 14. A Portal application 2 in the present invention may be defined as an Web application which provides a secure, single point of interaction with diverse information, business processes, and people, personalized to a user's needs and responsibility.

Portal applications 2 as used by the preferred embodiment of the present invention implements the standard functionality like security, authorization 13, authentication 11, aggregation 15, caching, user management, enrolment, rendering, and rewriter proxy functionality for granting access to access protected remote resources 3. This portal architecture includes preferably APIs (Portlet Container) 23 for the integration of applications so that applications from different partners can be used as long as they match the portal product's API. In the portal environment, these applications are typically called portlets. The rewriter proxy 14 is preferably implemented as a portlet. Typically, such portal applications 2 run in an application server environment.

Figure 4A:
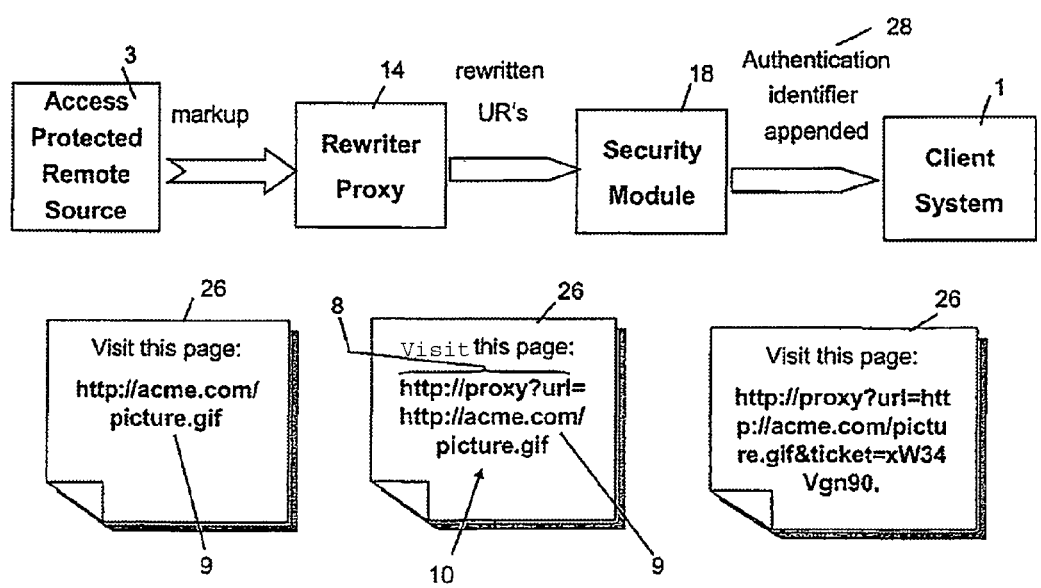
FIG. 4A shows a diagram of the communication flow from the access protected remote resource to client system when using the present invention.

The inventive security module 18 provides at least an interface to the rewriter proxy portlet 14. Preferably, the security module is implemented as a portlet. As already explained in detail, the rewriter proxy 14 which is allowed to access the access protected remote resources 3 has to ensure that all incoming user client requests as well as incoming responses from the access protected remote resources 3 are respectively rerouted to their destination. In more detail as shown in FIG. 4A, the rewriter proxy 14 replaces the original URIs 9 contained in the content (e.g. markup) 26 provided by the access protected remote resources 3 by rewritten URIs 10 including the URI 8 of the rewriter proxy 14 and as a parameter the original URI 9 of the access protected remote resource 3.

Before the rewritten URIs 10 can be used to replace the original URIs 9 contained in the respective markup 26, they are provided to the security module 18. The security module 18 then calculates an authentication identifier 28. That may be preferably achieved by applying a secure hash algorithm and/or a secret key (Message Authentication Code) to the original URI 9 or to entire rewritten URI 10 and adds the authentication identifier 28 as an additional parameter to the rewritten URI 10 (see FIG. 4A) However, all other existing authentication methods including encryption methods may be used.

Figure 4B:
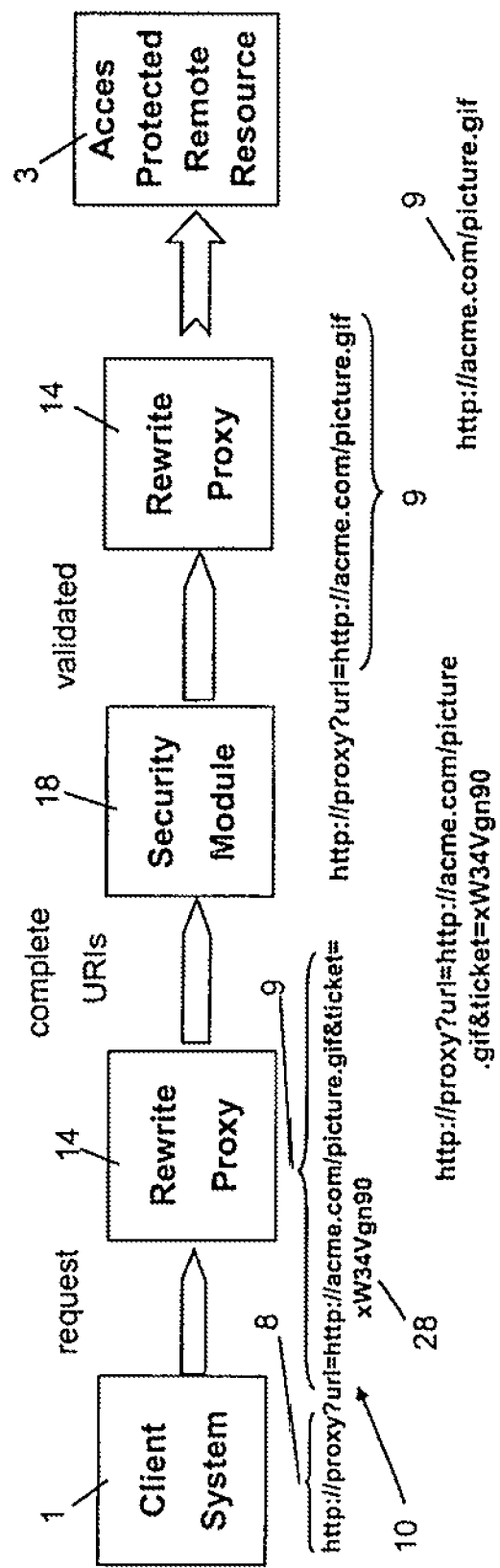
FIG. 4B shows the diagram of the communication flow from the client system to and access protected remote resource when using the present invention.

Then, the rewritten URI 10 including the authentication identifier 28 is provided back to the rewriter proxy 14. The rewriter proxy 14 replaces the original URI 9 contained in the markup 26 and provides the markup to aggregation component 15 of the Portal application 2. In more detail as shown in FIG. 4B, when the user activates such a link including the rewritten URI 10 with an authentication identifier 28, a request is sent to the rewriter proxy 14. The rewriter proxy 14 provides the rewritten URI 10, including the authentication identifier 28 to the security module 18. The security module 18 validates whether the URIs contained in the request have been changed by the user.

This is accomplished by applying the same secure hash algorithm and the same secret key to the rewritten URI 10 contained in the client's request. If the calculated authentication identifier 28 matches with authentication identifier 28 contained in the client's request, the security module 18 provides the request to the rewriter proxy 14 that connects to the access protected remote resource 3 (see FIG. 4B).

The new introduced security module 18 should be preferably programmed that it does not interfere with the rewriter proxy 14 rewriting mechanism. Therefore it has to modify the resource URIs generated by the rewriter proxy 14 after they have been rewritten and before they are written to the respective markup. On the other side whenever a request is sent to the rewriter proxy 14 it has to validate the requested URI before the portlet fetches the referenced access protected remote resource 3.

A reasonable implementation approach for the security module 18 could be a streaming mechanism where the rewritten URIs are written to an output stream provided by the security module 18. This output stream modifies the URIs written to it using one of the three above techniques.

When an end-user interacts with the generated markup and activates a access protected remote resource URI, the request traverses the following steps through the components. The security module 18 validates the requested URI and on success passes the location of the resource to the rewriter proxy 14, which than fetches the access protected remote resource on behalf of the end-user. Again a streaming mechanism symmetric to the mechanism that has been used to generate the resource URI would be a good implementation approach. Here an input stream is build from the secured resource URI and used to validate or decrypt the URI. The rewrite proxy 14 reads the access protected remote resource location from the input stream provided by the security module 18 or receives an error.

Figure 3:
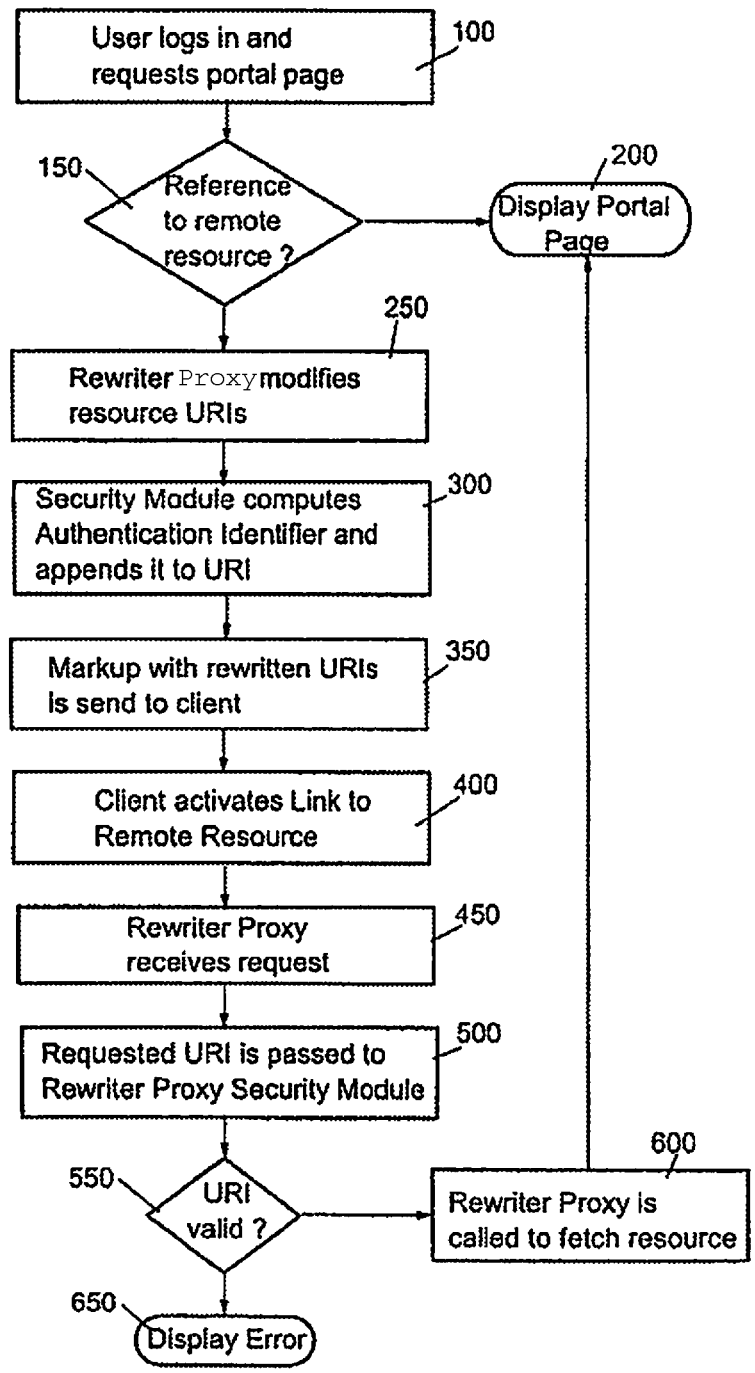
FIG. 3 shows a diagram of the overall communication flow between client-system, portal application using rewriter proxy inventive security module, and access protected remote resources.

FIG. 3 shows a diagram of the overall communication flow between client-system, portal application with rewriter proxy, inventive security module, and access protected remote resource. The user logs in to the portal by authenticating itself and is authorized to view a portal page with at least one portlet 100. It is checked if any portlet on that page contains links to access protected remote resources, e.g. access protection is accomplished via a firewall 150. If this is not the case the page is displayed 200.

If this is the case, the rewriter proxy rewrites all links to access protected remote resources in a way that the links point to the rewriter proxy instead of their original access protected remote resource location. The original URI is included in the rewritten URI as parameter 250. The security module reads the passed rewritten URI and computes an authentication identifier 300. The authentication identifier can be computed by the following specific implementations:

In a first implementation, simply a hash algorithm is applied to original URI and its result is appended to the rewritten URI as a parameter. In second implementation, a secret key is applied to the original URI and its result is appended to rewritten URI as a parameter. In a third implementation, a secret key is applied to the original URI and a hash function is applied to its result and its final result is appended to the rewritten URI as a parameter. In a fourth implementation, a symmetric encryption algorithm is applied to the original URI and its result replaces the original URI in the rewritten URI.

The rewritten and secured resource URIs are used to replace the original URI's in the markup that is sent to the client 350. The user's client activates the rewritten URI pointing to the access protected remote resource 400. The rewriter proxy receives the request 450 and reads the requested URI which is then passed to the security module 500. The security module validates the incoming request including the rewritten URI depending on the specific implementation used for computing the authentication identifier as follows:

In first, second, and third implementation cases, the same method for computing the authentication identifier as described above has to be repeated and the result is compared with authentication identifier contained in the rewritten URI. If they match, the security module provides the user client request to rewriter proxy that grants access to the access protected remote resource 600. If the access protected remote resource contains URIs to access protected remote resources the same inventive method as described is applied again.

In the last implementation case using encryption algorithm, the corresponding decryption algorithm has to be applied to the authentication identifier. If decryption is successful, the original URI is appended to the request. The request is provided to the rewriter proxy that grants access to the access protected remote resource 600. The calculated authentication identifier is compared with the authentication identifier contained in the requested URI 550. If they match the rewriter proxy is called to fetch the requested access protected remote resource 600. If the access protected remote resource contains URIs to access protected remote resources the same inventive method as described is applied again. In case the validation of the authentication identifier fails no access to the access protected remote resource is allowed 650.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A server system in a client server environment comprising:
    a web application running in a memory on the server system;
    a communications link to a client system;
    a communications link to an access protected remote resource allowing communication between said web application and said access protected remote resource;
    a rewriter proxy comprising logic configured to identify a reference in a response from said access protected remote resource pointing to said access protected remote resource, to generate a rewritten uniform resource identifier (URI) for said identified reference including a URI of said rewriter proxy and an original URI of said reference, and to replace said original URI in said response with said rewritten URI; and
    a security module executing in the memory of the server system configured to generate an authentication identifier by applying an authentication process to at least said original URI of said reference, to add said authentication identifier to said rewritten URI before said original URI has been replaced by said rewritten URI, and to validate said authentication identifier contained in said rewritten URI depending upon an authentication process applied to at least said original URI of said reference,
    wherein said web application provides said response including said rewritten URI and authentication identifier to the client system.

2. The system according to claim 1, wherein said web application is a portal application.

3. The system according to claim 2, wherein said rewriter proxy and said security module are integrated part of said portal application.

4. The system according to claim 2, wherein said rewriter proxy and said security module are implemented in said portal application as one of a single portlet and an integrated portlet.

5. A non-transitory machine readable storage having stored thereon a computer program for controlling access of a client system to an access protected remote resource by using a web application, the computer program comprising a routine set of instructions which when executed by a machine causes the machine to perform the steps of:

receiving a response to a client request to access the access protected remote resource from the access protected remote resource;

identifying a reference in said response pointing to the access protected remote resource;

generating a rewritten uniform resource identifier (URI) by adding a URI of the web application to an original URI for said identified reference and further generating an authentication identifier by applying an authentication process to at least a portion of said original URI;

adding said generated authentication identifier to said rewritten URI and replacing said original URI with said rewritten URI; and, sending a response including both rewritten URIs to the client system, both rewritten URIs include the rewritten URI with the added URI of the web application added to the original URI for said identified reference and also the rewritten URI with both said added generated authentication identifier and also the added URI of the web application added to the original URI for said identified reference.

6. The machine readable storage according to claim 5, wherein the computer program further comprises the routine set of instructions which when executed by the machine causes the machine to perform the steps of:

receiving a client request including said rewritten URI having the added URI of the web application added to the original URI for said identified reference;

applying an authentication validation to said rewritten URI having the added URI of the web application added to the original URI for said identified reference to determine whether said rewritten URI having the added URI of the web application added to the original URI for said identified reference has not been changed; and, granting access to the access protected remote resource when said authentication validation succeeds.

7. The machine readable storage according to claim 5, wherein the web application is a portal application.

8. The machine readable storage according to claim 5, wherein the access protected remote resource is protected by a firewall.

9. The machine readable storage according to claim 5, wherein said response from the access protected remote resource contains content formatted according to a markup language.

10. The machine readable storage according to claim 5, wherein said routine set of instructions for the computer program for generating the authentication identifier by applying the authentication process further comprises applying the authentication process to an entire portion of said rewritten URI having the added URI of the web application added to the original URI for said identified reference.

11. The machine readable storage according to claim 5, wherein said routine set of instructions for the computer program for generating the authentication identifier by applying the authentication process comprises generating the authentication identifier by applying a HASH algorithm to said original URI.

12. The machine readable storage according to claim 5, wherein said routine set of instructions for the computer program for generating the authentication identifier by applying the authentication process comprises generating the authentication identifier by applying a secret key to said original URI.

13. The machine readable storage according to claim 5, wherein said routine set of instructions for the computer program for generating the authentication identifier by applying the authentication process comprises generating the authentication identifier by applying a secret key to the original URI and applying to the result of the application of the secret key to the original URI, a HASH algorithm.

14. The machine readable storage according to claim 5, wherein said routine set of instructions for the computer program for generating the authentication identifier by applying the authentication process comprises generating the authentication identifier by applying a symmetric encryption algorithm to said original URI.

* * * * *